No. 627,589. Patented June 27, 1899.
W. MOON.
SPEED INDICATOR.
(Application filed Apr. 21, 1899.)
(No Model.)

Witnesses:
Chas. E. Gaylord
Lutie S. Potter

Inventor:
Warren Moon,
By Banning & Banning & Sheridan,
Attys.

UNITED STATES PATENT OFFICE.

WARREN MOON, OF CHICAGO, ILLINOIS, ASSIGNOR TO THE CONSTRUCTION AND MAINTENANCE COMPANY, OF SAME PLACE.

SPEED-INDICATOR.

SPECIFICATION forming part of Letters Patent No. 627,589, dated June 27, 1899.

Application filed April 21, 1899. Serial No. 713,844. (No model.)

*To all whom it may concern:*

Be it known that I, WARREN MOON, a citizen of the United States, residing at Chicago, Cook county, Illinois, have invented certain new and useful Improvements in Speed-Indicators, of which the following is a specification.

The invention relates to that class of indicators that is used for the purpose of indicating the speed at which a shaft is rotating or the speed at which a vehicle is traveling—such as the miles per hour or the rate at which it is traveling per mile, as a mile in two minutes—as contradistinguished from that class of indicators which indicates the number of rotations or revolutions that a shaft has made.

The object of the invention is to provide a simple, economical, and efficient speed-indicator; and the invention consists in the features, combinations, and details of construction hereinafter described and claimed.

Figure 1:
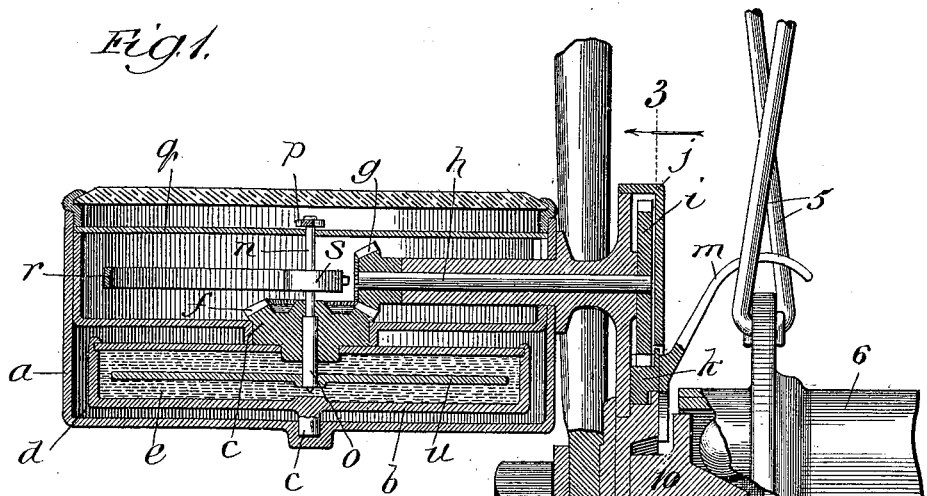
Figure 2:
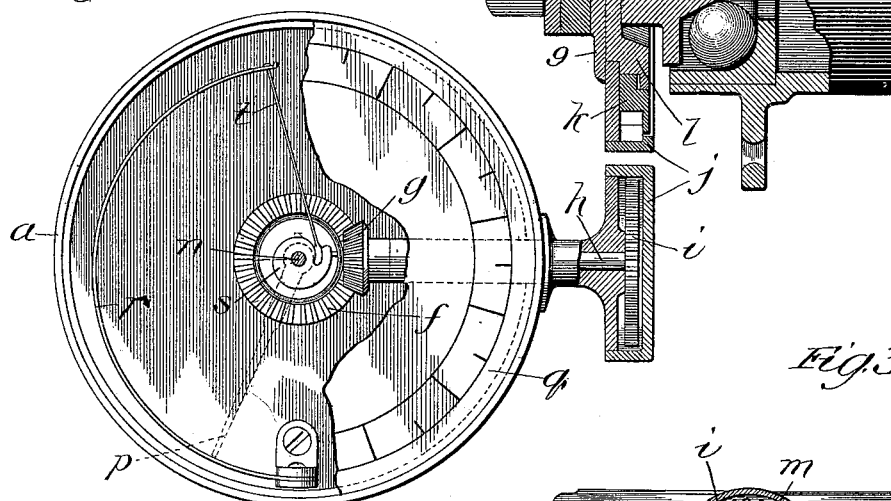
Figure 3:
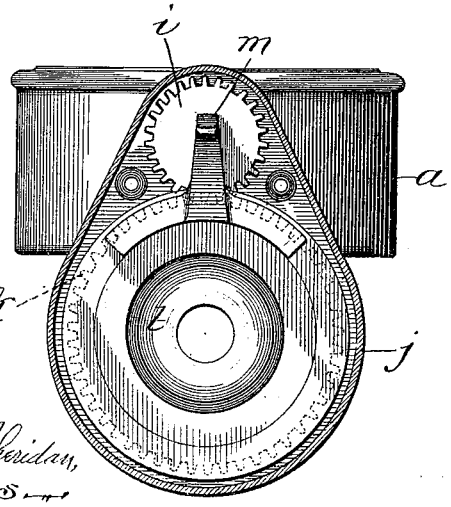

In the accompanying drawings, Figure 1 is a sectional elevation of an indicator constructed in accordance with my improvements, shown as it appears when in position when used in connection with a bicycle or velocipede; Fig. 2, a plan view of the same, partly in section and with a dial partly broken away; and Fig. 3, a side elevation of the mechanism, partly in section, looking at it from line 3 of Fig. 1 and in the direction of the arrow.

In the art to which this invention relates it is well known that it is desirable for the rider of a velocipede or the operator of a high-speed machine—such as a silk-machine or an electric dynamo, &c.—to keep informed as to the comparative speed at which the machine is running at all times and not have to wait until the machine has run a certain number of revolutions before he is informed.

The principal object of the invention, therefore, is to provide a machine which will accomplish and indicate these results.

In constructing a machine or instrument in accordance with these improvements a main casing $a$ of the desired size, shape, and strength is provided and adapted to inclose, hold, and protect the operative mechanism in position for use. Inside of this main case a rotatable cylinder $b$ is provided, which has its journals $c$ in the main casing and preferably arranged in a separate inclosed chamber $d$ thereof, so that during its rotations it will not be disturbed by any outside or extraneous influences. This rotatable cylinder $b$ is what might be termed a "retarding-cylinder," in which material $e$, such as mercury, is kept for the purpose of developing centrifugal force and acting with a retarding effect, as will be hereinafter more fully set forth. This rotatable retarding-cylinder is provided with a bevel-pinion $f$, which in turn is engaged with a second bevel-pinion $g$, mounted upon a driving-shaft $h$, extending out through an arm of the main casing. This driving-shaft $h$ is provided at its outer end with a spur-pinion $i$, and the arm of the casing is provided with a hood, in which is mounted in suitable bearings a driving-gear $k$. This driving-gear is held in place in the hood between the back plate of the same and a flanged washer $l$, so that it cannot be removed until the flanged washer is removed.

To transmit the rotations of a bicycle-wheel—a section of the spokes 5, hub 6, and axle 7, which are shown in the drawings—the driving-gear is provided with an arm or dog $m$, projecting therefrom and adapted to be contacted by the spokes of the bicycle-wheel during its rotation and adapted to be turned by the same. To hold the indicator in place, the flanged washer is perforated, so that it may be passed on the axle 7 of the bicycle-wheel or shaft and secured between the washers 9 and bearing portion 10 in the position shown in Fig. 1 of the drawings, from which it can be readily removed and into which it can be readily inserted at any desired time. Of course it will be understood that this indicator may be secured adjacent to any rotating shaft or pulley to indicate its speed.

To indicate the speed at which the machine is running, an indicating-staff $n$ is provided, having its body portion $o$ located within the retarding-cylinder and its upper portion projecting therethrough and provided with an indicating-hand $p$, arranged above a dial $q$. This indicating-staff is loosely or independently and rotatably mounted in the rotatable retarding-cylinder, so that such cylinder may have independent rotations. In order to hold the indicating-hand at zero or at a normal point, a tension-spring *r* is provided and secured to the casing in any desired manner. This tension-spring is connected with a cam *s* on the connecting-shaft by means of a small chain *t*, which may be made of the "fusee" or other type of chain. In order to operate this engaging hand when the retarding-cylinder is rotating, a retarding-disk *u* is provided and rigidly secured or fixed in any desired manner to the indicating-staff inside of the retarding-cylinder, so that the liquid or other material therein may have its proper effect thereon.

In operation rotation is imparted to the rotatable retarding-cylinder by means of the spur-gears and bevel-pinions, and such rotatable cylinder carries the liquid around with it and develops centrifugal force at its peripheral inner surface, where it is in a measure compressed by the upper and lower walls of the cylinder and clamps the retarding-disk between it under a force of friction. This force of friction is developed by centrifugal action and has a tendency to rotate the indicating-staff and carry the hand around on the dial until its force is counteracted or counterbalanced by the tension-spring, and thus indicate at about what speed the vehicle is running per minute or per hour or the speed per mile. It will thus be seen that when my instrument is in operation there are two forces at work—first, the centrifugal force of a liquid or material, and, second, a force of friction on the retarding disk or plate.

The principal advantage incident to the use of an instrument constructed in accordance with my improvements is that it will begin to indicate at very low speeds—at about five revolutions up to several thousands.

I claim—

1. In an instrument of the class described, the combination of a casing, a rotatable cylinder secured within such casing, a bevel-pinion on such rotatable cylinder, a bevel-pinion engaged therewith so as to drive the same and provided with a spur-pinion extending outside of the casing, and a second spur gear or pinion engaging therewith and provided with means by which it may be engaged by a rotating shaft or similar element and operate the rotatable cylinder as and for the purposes specified.

2. In an instrument of the class described, the combination of a casing, a rotatable cylinder secured within the casing, a staff independently mounted in such rotatable cylinder and adapted when such cylinder is rotated to be subjected to the action of centrifugal and frictional force to indicate the speed of a rotating object, a cam on such shaft, a tension-spring secured to the casing and a chain or similar element secured to the tension-spring and to the cam, substantially as and for the purposes described.

WARREN MOON.

Witnesses:
THOMAS B. MCGREGOR,
THOMAS F. SHERIDAN.